US009698990B1

(12) United States Patent
O'Dell et al.

(10) Patent No.: US 9,698,990 B1
(45) Date of Patent: Jul. 4, 2017

(54) MAKING UNIQUE PASSWORDS FROM THE SAME STRING OF CHARACTERS, INCLUDING ANY STRING OF CHARACTERS IN A WEB ADDRESS

(71) Applicants: Robert Barry O'Dell, Oakland, CA (US); James D. Ivey, Oakland, CA (US)

(72) Inventors: Robert Barry O'Dell, Oakland, CA (US); James D. Ivey, Oakland, CA (US)

( * ) Notice: Subject to any disclaimer, the term of this patent is extended or adjusted under 35 U.S.C. 154(b) by 0 days.

(21) Appl. No.: 15/011,217

(22) Filed: Jan. 29, 2016

(51) Int. Cl.
*G06F 21/00* (2013.01)
*H04L 9/32* (2006.01)
*H04L 9/06* (2006.01)
*G06F 21/31* (2013.01)

(52) U.S. Cl.
CPC .......... *H04L 9/3226* (2013.01); *H04L 9/0662* (2013.01); *G06F 21/31* (2013.01)

(58) Field of Classification Search
CPC ... H04L 9/3226; H04L 9/0662; H04L 9/0656; H04L 63/083; G06F 21/31
USPC .................................................. 713/183–184
See application file for complete search history.

(56) References Cited

U.S. PATENT DOCUMENTS

| 7,103,912 | B2 * | 9/2006 | Xia | G06F 21/31 |
| | | | | 726/10 |
| 8,127,141 | B2 * | 2/2012 | Hypponen | G06F 21/36 |
| | | | | 713/184 |
| 2003/0005299 | A1 * | 1/2003 | Xia | G06F 21/31 |
| | | | | 713/171 |
| 2004/0073815 | A1 * | 4/2004 | Sanai | G06F 21/46 |
| | | | | 726/6 |
| 2004/0139331 | A1 * | 7/2004 | Sanai | G06F 21/46 |
| | | | | 713/184 |
| 2005/0071686 | A1 * | 3/2005 | Bagga | G06F 21/46 |
| | | | | 726/19 |
| 2007/0245149 | A1 * | 10/2007 | Lin | H04L 9/0662 |
| | | | | 713/184 |
| 2008/0092216 | A1 * | 4/2008 | Kawano | G06F 21/46 |
| | | | | 726/5 |

(Continued)

*Primary Examiner* — Samson Lemma

(57) ABSTRACT

Very strong, complex, unforgettable passwords unique to each web site are created for a user's Web site authentication by altering all or part of the web site address using, in a preferred embodiment, a predetermined encoding dictionary with more a single code for each entry and unique to each user. The entries in this preferred embodiment are single characters including characters used for words, punctuation, symbols and numerals; each single entry character appears more than once in the dictionary. The codes are of various character lengths and can be comprised of the same characters used in the entries. In a Web site authentication embodiment as well as for embodiments not used for Web site authentication, including pass-protecting files, the string of characters altered by encoding can be a private word or group of words. In another embodiment the password created by encoding is pseudo-randomly scrambled by using a seed unique to the user in order to create the password actually used. In yet another embodiment, the password is created without the encoding step, by pseudo-randomly scrambling the web address or other user-selected character string using a seed unique to the user.

10 Claims, 8 Drawing Sheets

(56) References Cited

U.S. PATENT DOCUMENTS

2013/0124292 A1\* 5/2013 Juthani ................... G06F 21/41
                                                        705/14.26
2013/0283337 A1\* 10/2013 Schechter ............... G06F 21/46
                                                        726/1

\* cited by examiner

FIGURE 2

| ENTRIES | CODES |
|---|---|
| A | Lb |
| a | D |
| 4 | x4 |
| & | *h |
| m | :41 |
| t | c% |
| ... | ... |
| a | =ty |
| K | f+2 |
| z | i |
| ... | ... |
| # | Gg |
| o | jpl |
| e | mr |
| n | S# |
| ... | ... |

MAKING UNIQUE PASSWORDS FROM THE SAME STRING OF CHARACTERS, INCLUDING ANY STRING OF CHARACTERS IN A WEB ADDRESS

CROSS-REFERENCE TO RELATED APPLICATIONS

This application claims priority of U.S. Provisional Patent Application Ser. 62/200,589 filed 3 Aug. 2015 entitled "Making Different Passwords From The Same String Of Characters Including Any String of Characters Used As A Web Address" by Robert B. O'Dell and U.S. Provisional Patent Application Ser. 62/114,414 filed 10 Feb. 2015 entitled "Making Different Passwords From The Same String Of Characters Including Any String of Characters Used As A Web Address" by Robert B. O'Dell

FIELD OF THE INVENTION

The present invention relates generally to processing of computer data, and, more particularly, to methods of and systems for authentication of a computer network user or for limiting access to computer files.

BACKGROUND OF THE INVENTION

Problems with authenticating website users through the use of passwords are well known. Users are told to create very strong passwords, use different passwords on every site, record or remember all their passwords, and keep all of them private. The burden is on the user, yet even for the users who are willing and able to do all of this there is still more work for them if passwords are stolen from a website they frequent. They then have to provide a new, unique, strong password for that site. The problem for users is magnified for those who use the same password for all or most of the web sites they visit, creating a real headache when their password is compromised. But using a complicated and different password for each site requiring user authentication is a trial for many people, even when using a password manager.

Similar problems arise for those who wish to password protect files or discs on the computer itself. They can be locked out of a file or disc simply because they have forgotten or misplaced the password they used to keep the material private.

What is needed is a method and system for creating and using passwords that recognizes that not all users are willing or, perhaps, able to take the recommended steps required to protect their passwords, a method and system which provides passwords that are private, unforgettable, easily changed, very strong and far less burdensome for the user.

SUMMARY OF THE INVENTION

In accordance with the present invention, a password calculator derives a strong password from user-entered text in a deterministic, repeatable manner. For example, the password calculator can receive user-entered text of "Amazon" and derive therefrom the password "Lb:41s=ty6ijpl$#". In effect, the password calculator can accept a weak and easy to remember password and produce therefrom a strong and difficult to guess password. While "Amazon" would be a weak and easy to guess password for use on the amazon.com web site, "Lb:41s=ty6ijpl$#" is much, much better and is accessible to the user by remembering only the weak password of "Amazon".

Such makes it unnecessary for a user of a WWW web site requiring a password to remember the password which authenticates the user at the web site. Instead of remembering the password needed for the web site, the user uses the password calculator to create a password simply by altering the address of the web site, copying it and pasting the altered result into the password box at the site. Since the password can be recreated each time it will be needed, the resulting password is unforgettable, yet the password is also very strong and quite complex. This password can, of course, be saved by well-known browser software after first used at the web site then inserted automatically when needed again at the site, but, since it is easily recreated, the password does not need to be stored on the user's computer device or anywhere else. The password created is unique for every visitor to the same web site who uses the password calculator, and, since each web site has a different web address, the password is different at every site where the user employs the invention. And if stolen from the site or otherwise compromised the password is easily altered by altering the input that creates it.

In a preferred embodiment, the password calculator makes all of this possible—the uniqueness, the strength, and the use of the web site's full or partial address or—by using a predetermined encoding dictionary unique to each user which is used to alter the web address by replacing the characters of the web address with codes from the dictionary.

The dictionary entries are single characters, including the characters used for numerals, symbols, punctuation marks and the characters used to make words. Each dictionary entry has a different code.

Each entry in this embodiment appears more than once among the entries, with the result that each entry has more than one possible code. And, since the search among entries for each character of the web address during encoding continues through the entries after encoding each character of the web address, it is highly unlikely that a code is repeated during the encoding of a web address.

The codes in this preferred embodiment vary in length, being comprised of 1, 2 or 3 characters. The characters used to make the codes in this embodiment are the same characters used in the entries, but in other embodiments include characters of more than one language—alphabetic or not.

While the entries in the dictionaries of all users are identical and identically ordered in this preferred embodiment, the order of the codes representing the entries in the dictionary in this embodiment are different for each user, and, often, the codes themselves are substantially or entirely different in different dictionaries. All such variation in codes among user dictionaries goes a long way to guarantee the uniqueness and strength of the password created.

In an embodiment wherein the character string to be altered is not a web address, the alteration is done by pseudo-randomly scrambling the character string to be altered without first encoding the string. In such an embodiment where the invention is useful not only for web site passwords but also for password-protecting files or discs, any string of characters can be used as the string of characters used to create the password.

In another embodiment, the creation of the password is followed by pseudo-randomly scrambling the password as a second step after encoding.

In another embodiment, there is no encoding step; instead, to create the password for a web site, the web site address is pseudo-randomly scrambled using a seed unique to each user.

In another embodiment, the password calculator does not use a dictionary but instead pseudo-randomly generates a password using a pseudo-random number generator that is seeded with the user-entered text. In particular, a numerical value is derived from the user-entered text, e.g., a cryptographic hash of the user-entered text, and the pseudo-random number generator is seeded with that numerical value. The process is deterministic in that, given the same user-entered text each time, the pseudo-random number generator will be similarly seeded, will produce the same sequence of pseudo-random numbers, and accordingly produce the same password.

In accordance with the present invention a password calculator without a dictionary also will produce different passwords for identical user-entered text entered by different devices. For example, if the password calculator derives the password "Lb:41s=ty6ijpl$#" from the user-entered text "Amazon" in one device, the password calculator executing in a different device derives a very different password from the user-entered text "Amazon". To do this, the password generator combines the user-entered text with device-specific data that is highly likely to be unique among different devices prior to deriving the numerical value used to seed the pseudo-random number generator. The device-specific data can be a time-and-date nonce associated with the device or associated with the time at which the user enters the text for which a password is desired, for example, "Amazon." The time-and-date nonce in another embodiment is associated with only the first entry of a text for which a password is desired.

A BRIEF DESCRIPTION OF THE DRAWINGS

FIG. 2 is a partial presentation of the predetermined electronic dictionary wherein is displayed single characters and codes that represent those single characters in accordance with the invention.

FIG. 3 illustrates one embodiment of a step of the logic flow diagram of FIG. 5.

DETAILED DESCRIPTION OF THE INVENTION

Figure 1:
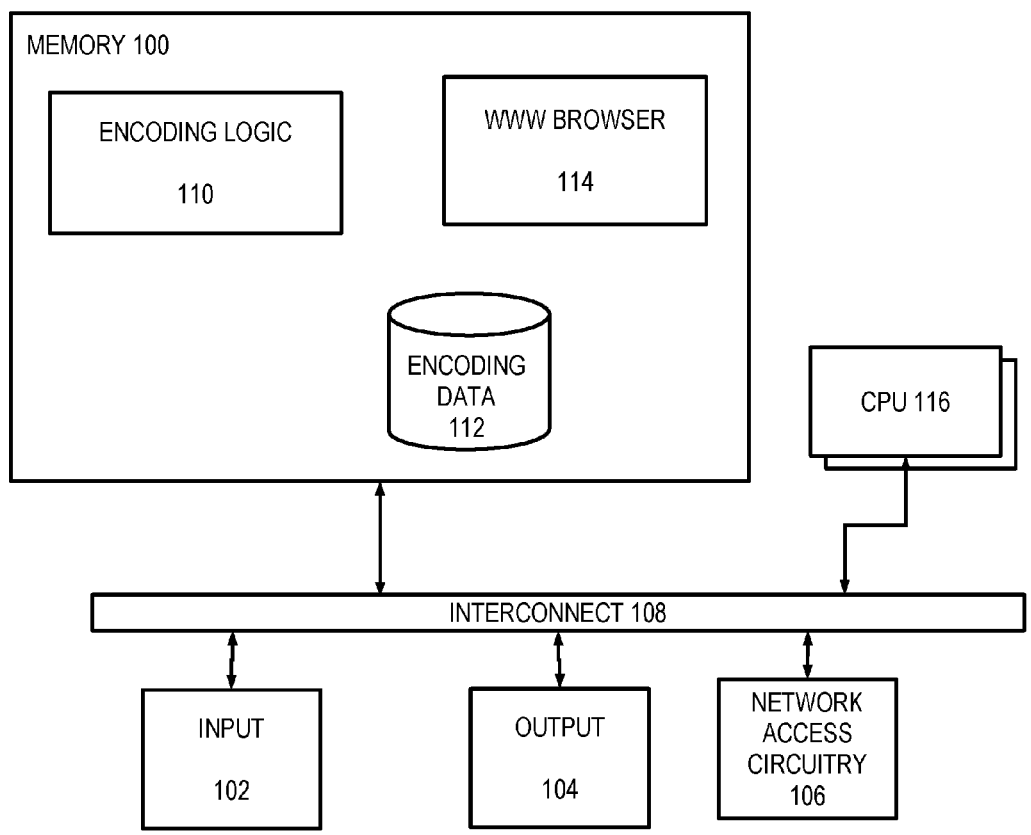
FIG. 1 is a block diagram of a computer system configured to encode a string of characters so as to create a unique password from the string using a predetermined dictionary of single characters and codes representing those single characters in accordance with the invention.

In accordance with the present invention, character strings, including web addresses and file names, are altered to create passwords. In the preferred embodiment, electronic encoding dictionaries unique to each user of the present invention are used to create from a group of characters a password that is different from the password created for that same group of characters by other users of the invention. In other embodiments, the alteration of the character string is accomplished by use of a seeded pseudo-random number generator, as described herein. In yet another embodiment, both techniques are used to alter the character string so as to create a password.

In a preferred embodiment for use on the World Wide Web, an electronic encoding dictionary 112 ((1) unique to each user of the present invention is used to alter the address of a WWW web site so as to provide a password for the site. The password can't be forgotten, is very strong, and is unique to that site without any effort from the user to make it unique. Since every site has a different web address, the user's password will be different for every site. And, since the method of the present invention creates the password for a site by altering the web address of the site, the user need not worry about forgetting the password, since the method can be repeated with the user's unique electronic dictionary to easily create the same password for that same site at any time. Furthermore, by providing each user of the method a unique means of altering a web site address, the password for a web site will almost certainly be unique for each user of the present invention. Adding to the strength of the created password is its length, the variety of its characters, the use of multiple character codes of various lengths and the existence in the encoding dictionary of more than one code for any for any character represented by a code. The password will almost certainly be different not only from that of other users, but different from that provided from any other source. Another advantage of the disclosed password generator is that, in the case of theft of the user's password from a web site, the user does not need to change the password for any other site, and can quickly and easily create a new and very different password for the compromised web site by, for example, simply adding a single character to the beginning of the web address of the site before using the web address to make a new password; for example, the new password could be created from '2Amazon', if the password created from 'Amazon' were to be compromised. And the new password would be very different.

In the WWW embodiments discussed herein, the term 'password' is used to refer to the string of one or more characters sent to a web site as the user's password after alteration of a different character string by the present invention and can include white space in what some call a 'passphrase'. In a preferred WWW embodiment, the string of one or more characters that is sent to a web site to be used as the user's password is created by altering all or part of the web site's web address, for example, 'Amazon.com', using an electronic encoding dictionary wherein the codes of dictionary entries are unique for every user. The term 'entry' and its plural 'entries' are used herein to refer to single characters, each of which have a corresponding code in the encoding dictionary. There are two or more copies of each entry present in the electronic dictionary in this embodiment. The entries include the single characters used to make words in one or more languages. For example, in a preferred embodiment, entries in an electronic encoding dictionary for English include more than one copy of the letter 'a', with the result that the entry 'a' has more than one code available in the dictionary.

Users of a WWW embodiment can choose to alter not the web address but any string of characters, including the name of the site, i.e. just 'Amazon', rather than 'Amazon.com', or 'Wall Street Journal', rather than 'WSJ.com' or simply a user-chosen name such as 'mynews'.

While the characters used hereinafter in an illustrative example to describe the present invention are ASCII characters, it should be understood that any other characters that can be carried by the network and displayed on the user's computer device—including any and all Unicode characters—are also useful for using the method of the present invention to create passwords.

In a preferred WWW network embodiment, FIG. 1 shows features of a computer device used to create a password from a user-selected character string. These features include Memory 100; CPU 116; one or more input devices 102; one or more output devices 104; network access circuitry 106 which provides access to the WWW and device interconnect 108. CPU 116 includes one or more processors and is connected through interconnect 108 to memory 100. Memory 100 can be any kind of non-transitory computer readable media such as optical and magnetic disks and RAM and ROM. Input devices 102 can include a keyboard, touch-sensitive screen, pointing device, and a microphone. Output devices 104 can include a display screen and an audio speaker.

Memory 100 includes Web browser 114, which can be used to verify a web site address; encoding logic 110; and electronic encoding data 112. Web browser 114 and encoding logic 110 are each all or part of one or more processes executing in CPU 116 but can also be implemented using digital circuitry. As used herein, "logic" refers to digital circuit and/or computer instructions that can be executed by CPU 116 from memory 100. Encoding data 112 is data stored persistently in memory 100 and can be all or part of one or more databases.

Figure 3:
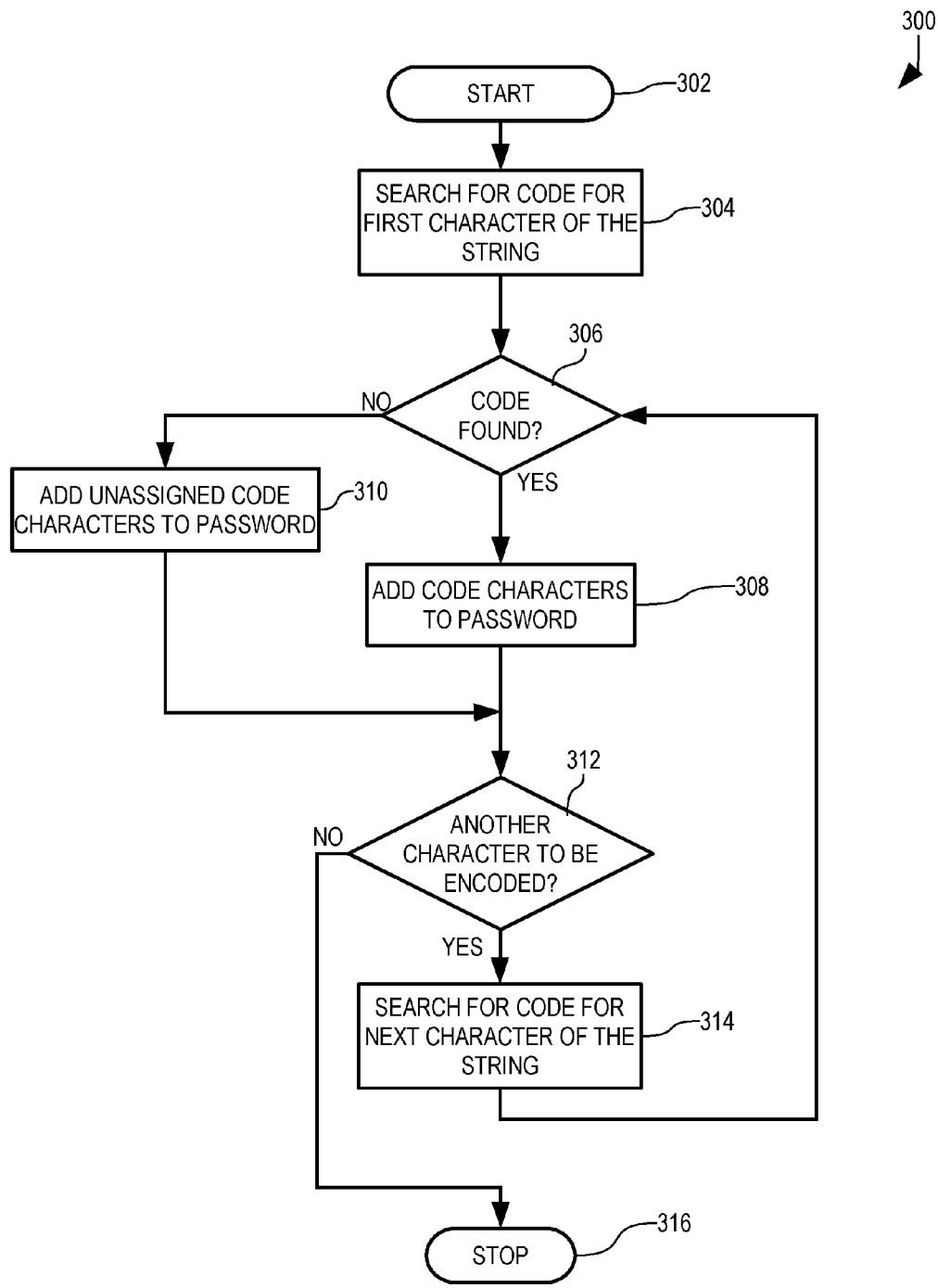
FIG. 3 is a logic flow diagram representing the encoding of the characters in the string of characters that are to be altered to create a unique password in accordance with the invention.
Figure 4:
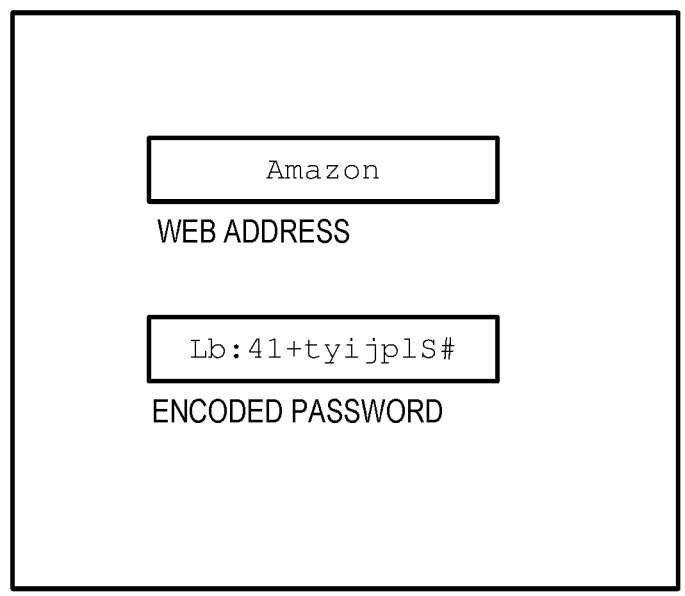
FIG. 4 is a diagram of the computer display of the computer system of FIG. 1 showing the string of characters AMAZON and the resulting password for the 'Amazon' website after the character string's encoding is complete in accordance with the invention.
Figure 5:
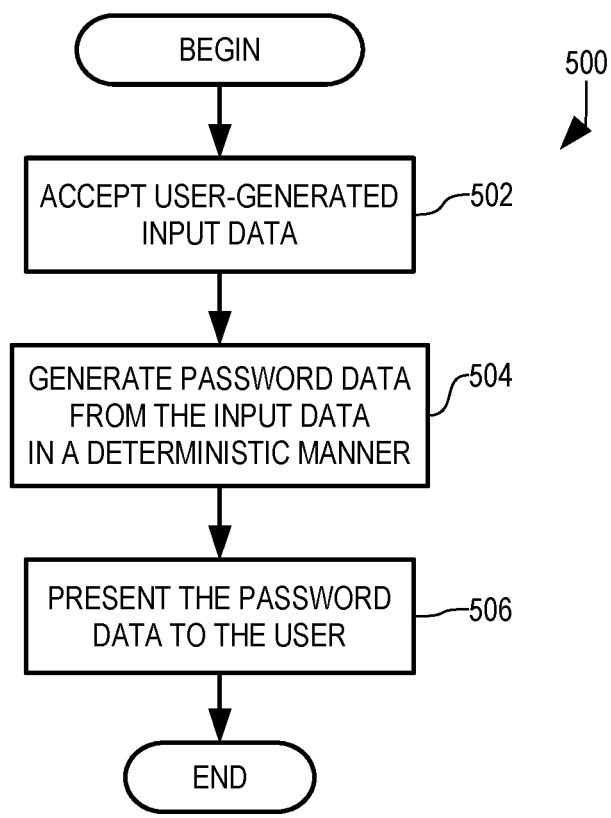
FIG. 5 is a logic flow diagram of the overall process of generating a strong password from user-entered text.
Figure 6:
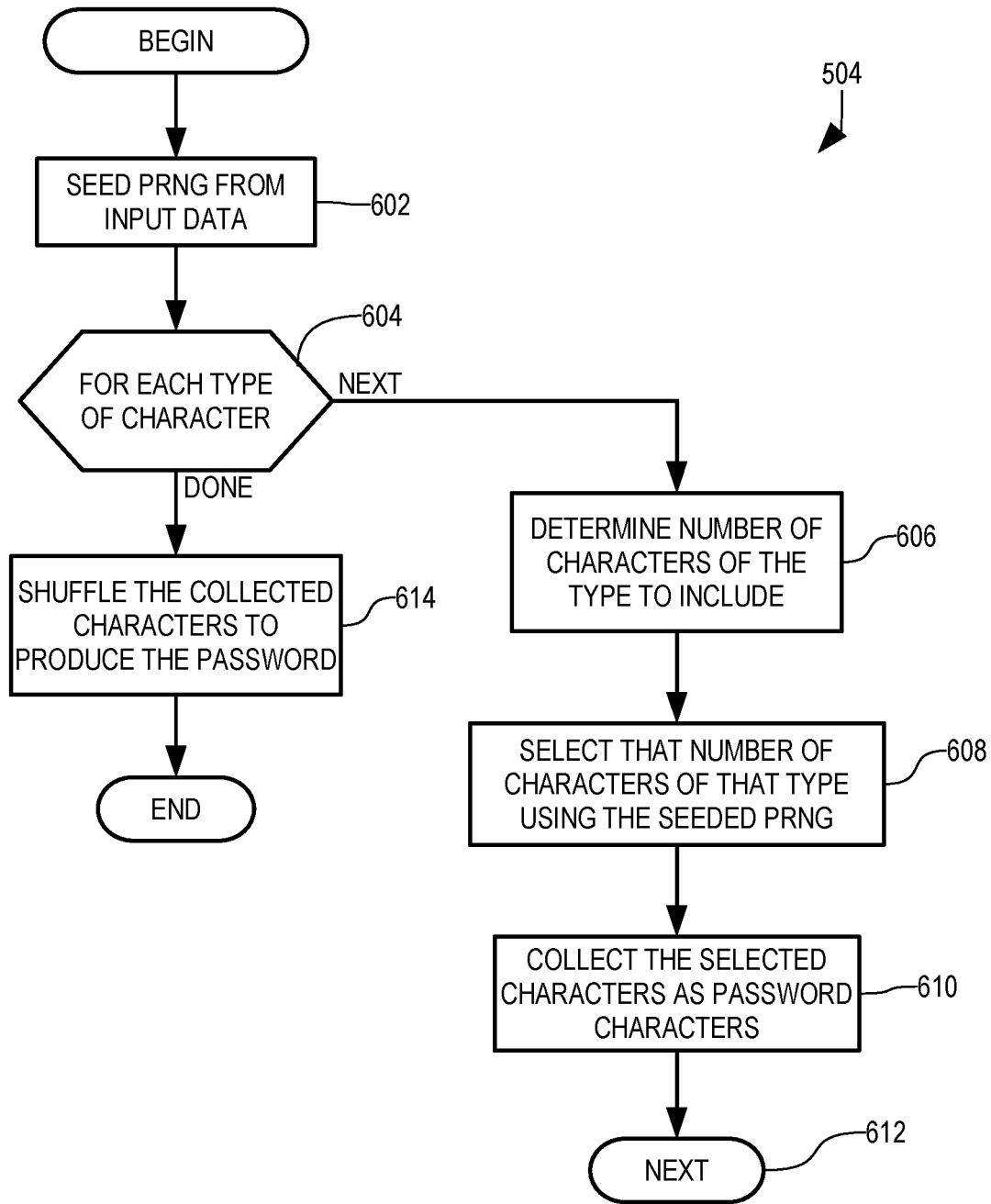
FIG. 6 is a logic flow diagram that illustrates an alternative embodiment of the step of the logic flow diagram of FIG. 5.
Figure 7:
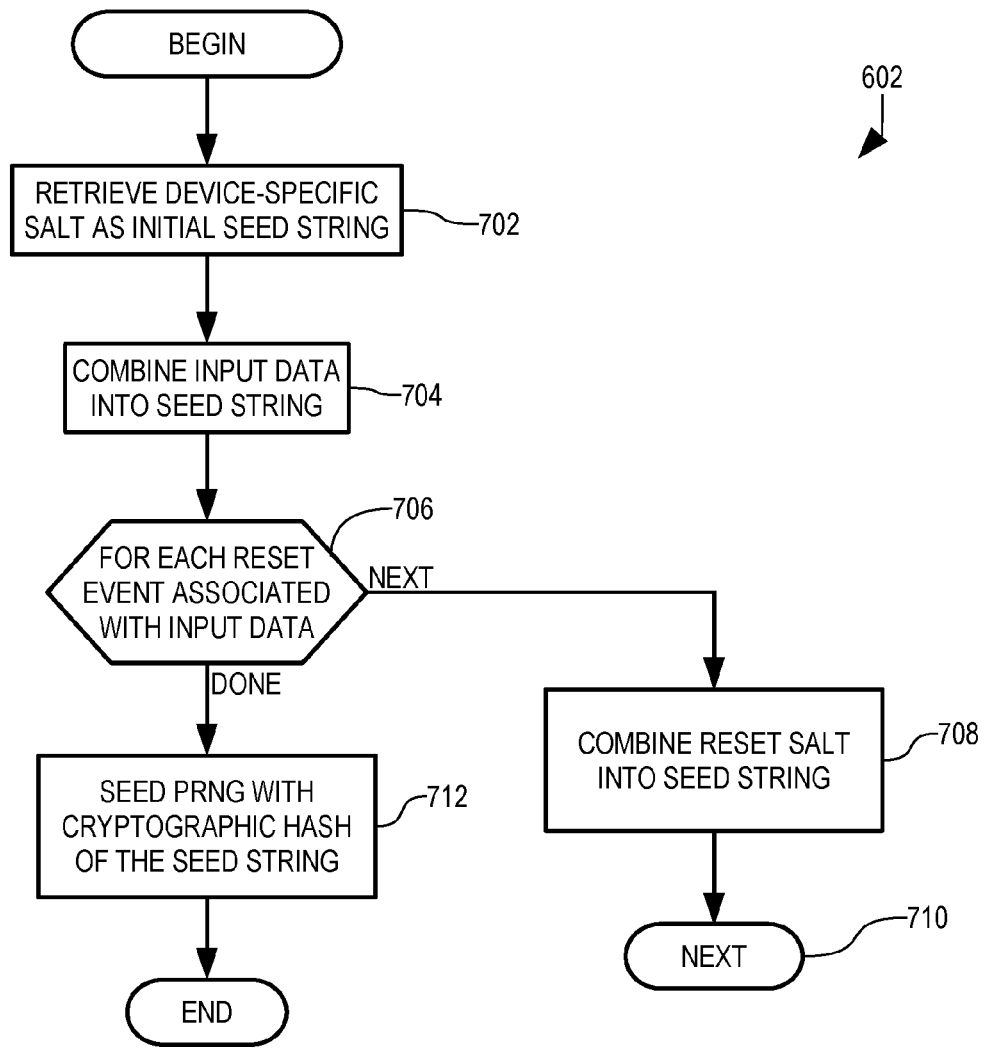
FIG. 7 is a logic flow diagram that illustrates a step of the logic flow diagram of FIG. 6 in greater detail.
Figure 8:
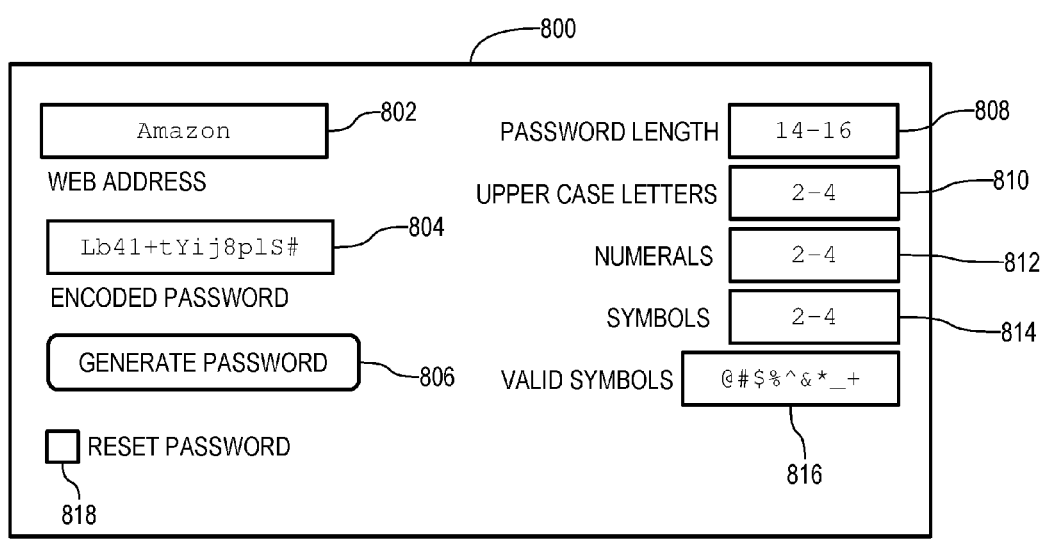
FIG. 8 illustrates a user interface by which a user can control the generation of a password according to the logic flow diagram of FIG. 6.

In the context of FIGS. 2-4, encoding data 112 is sometimes referred to as dictionary 112. Dictionary 112 has, in this embodiment, both two or more copies of each single-character entry and a code for each entry; each entry is a single ASCII character, and each code in this embodiment is comprised of either 1, 2 or 3 ASCII characters. While the code for each entry is different in each user's dictionary, the entries section of each users dictionary is, in this embodiment, identical to that of all other users of the invention.

Dictionary Entries

Entries found in dictionary 112 are seen in a representative illustrative English language sample of entries 202 of FIG. 2. Each entry in entries 202 of electronic encoding dictionary 112 in this embodiment is a single ASCII character. In an illustration of the embodiment using English there are 95 different ASCII entries in encoding dictionary 112, including all 'printable' ASCII characters but excluding the delete character. These ASCII characters are all of the printable characters accessible on a standard English language computer keyboard, in addition to the space character.

Dictionary 112 includes, in this English language illustration of this embodiment, 20 copies of the 95 ASCII characters, for a total of 1900 characters, which are scrambled pseudo-randomly and are in the same order in each user's dictionary. The order of entries is seen in the representative sample of dictionary entries 202.

Fewer printable characters accessible from a standard English keyboard are used in entries 202 in a different embodiment. In yet another embodiment, all characters used in the GSM character set are included in entries 202. It is to be understood that various other embodiments include characters from languages other than other English. And in one other embodiment, the characters used in entries 202 are characters from two or more languages, including non-alphabetic languages. And in yet one more embodiment, entries 202 includes words and groups of words. In yet another embodiment, symbols, except for punctuation marks, are excluded. And in another embodiment, groups of non-words including bigrams and trigrams are included in the entries.

The number of times each character is repeated as an entry in the electronic dictionary 112 in another embodiment depends on the frequency of usage expected of that character in English text or in the use of ASCII characters in web site addresses. In one other embodiment, the sequence of letters in each entry group of symbols and letters is ordered according to the frequency with which they follow one another in English text or in the use of ASCII characters in web site addresses. And in yet another embodiment the order of the entries in 202 are scrambled so as to be different for each user.

Codes for Each Entry

Codes corresponding to each entry found in dictionary 112 in this embodiment are seen in a representative sample of codes 204 of FIG. 2. Each entry in dictionary 112 has a different code. The characters used in codes are, in this embodiment, characters chosen from a character set usable on the WWW network. In this illustration of this embodiment, the characters used in codes are 95 of the ASCII characters—excluding the first 32 non-printing characters, and the delete character. Each code is either 1, 2 or 3 characters long. There are 95 one-character codes, and using the same 95 ASCII characters, there are 9,025 two-character codes possible and 857,375 three-character codes possible. In this embodiment we use only 1900 codes. We choose to have 95 one-character codes, 1,000 two-character codes and 805 three-character codes. The code lengths chosen for this preferred embodiment were chosen both to obscure the relationship between a code and its entry, and to make the resulting password very strong, while minimizing the length of the resulting password for most web sites. It should be understood that in other embodiments, both the number of code groups and the length of codes can be different, and even where there are groups of 1, 2 and 3 character codes, their groupings can be different than 95, 1,000 and 805.

Codes 204 are pseudo-randomly scrambled before being issued to a user so as to be ordered differently in each user's dictionary, thereby greatly decreasing the likelihood of a code appearing for the same entry when the present invention is used by two different users.

First, codes of the same length are pseudo-randomly scrambled, beginning with the 95 ASCII characters. Next a group of 1,000 two-characters codes—taken from among the 9,025 two-character codes, each of which includes two of the 95 ASCII characters—is pseudo-randomly scrambled and used as two-character codes. Finally, a group of 805 three-character codes taken from among the 857,375 different character codes possible using the 95 ASCII characters—is pseudo-randomly scrambled to be used as the group of three-character codes in the user's dictionary.

Not only will each user's codes be scrambled before being assigned to the entries section 202 in dictionary 112, but some, perhaps all, of the two and three character codes will be entirely different character combinations than those seen in the dictionaries of other users, i.e. codes seen in some user's dictionaries might not appear at all in the dictionaries of other users. For, example, since the number of three character codes present in the dictionary of each user is only 805 and the possible number of three character codes is 857,375, over 1,000 users can have entirely different codes in their dictionaries. And, considering the possible number of combinations of these 805 three-character codes, no user need have exactly the same codes in their group of 805 three-character codes as any other user. The nature of this variation is similar but smaller for the two-character codes. As a result of the scrambling and the variation in character codes described heretofore it is highly unlikely that the two or three character codes of any two users will all be the same, and even more unlikely that any codes they do share, whether 1, 2 or 3 characters in length, will represent the same entry.

It is to be understood that in other embodiments, far more or even fewer than 20 sets of entries and their corresponding codes can be useful, as well, both for English and for other languages.

An Illustrative Example Showing the Transformation of the Name of a Web Site into a Password Used to Authenticate the User of that Web Site The encoding of the name of the web site 'Amazon' using dictionary 112 begins at 301 of FIG. 3. For brevity and clarity of explanation, this example uses the common name of the site, 'Amazon', rather than the web site address, 'Amazon.com', or other, longer, Amazon addresses specific to a page of the Amazon site. Such a choice is one that some users might choose to make.

The search of the entries in 202 for codes to represent each consecutive character in the name of the web site during the creation of a password never backs up nor stays on the same entry after the entry is identified as the needed character. Instead, the search always resumes with the character following the entry just identified as the needed character. After creation of the password, the dictionary is unchanged, and creation of a password for a different site always begins again at the beginning of the list of entries in the dictionary. In this way, the present invention can create an identical password for the same web site as often as needed. And, with 20 copies of each character among the entries 202 of dictionary 112, the present invention is very unlikely to repeat a code when creating a given password.

Beginning at the top of the column of encoding dictionary entries 202 the password creation process for 'Amazon'—shown at 402 as the user-selected string of characters for the web address—starts at 302, searching consecutively through the entries of 1900 scrambled ASCII characters. The search for the first character in 'Amazon' begins at 304. Finding 'A', at 206, it asks at 306 if 'A' is represented by a code. 'A' is represented seen at 218 to be represented by the code [Lb]. Then in 308 the code [Lb] is copied and placed on line 404 of FIG. 4 as the first characters of the password. Line 404 will display the full password after the encoding is complete. Had a code not been found for 'A', the unassigned code [Pb*], which, in this embodiment is used for all characters of the user-selected string that are not found to have a code, would have been sent to line 404 of FIG. 4 as the first characters in the password.

The encoding process now asks at 312 whether there is another character in the string of user-selected characters—which is 'Amazon' in this case—and, since there is, resumes at 314 its search through this set of 1900 entries for the next letter in the word 'Amazon' by examining each of the characters following 'A' in entries 202, looking for the next character of 'Amazon', which is the letter 'm'. Rather than return to the start of the set of 1900 entries, the search has resumed at 314 with the entry that follows the entry 'A', and finds an 'm' at 208. The encoding process now asks at 306 whether this 'm' at 208 is represented by a code and finds that it is represented by the code [:41] seen at 220. Code [:41], representing 'm', is then added at step 308 to line 404 of FIG. 4 following the code [Lb] which is the code representing 'A'. Line 404 now reads Lb:41. The encoding process now asks at 312 whether there is another character in the string of user-selected characters and, since there is, resumes its search at 314 through the remaining characters in this same set of 1900 entry characters for the next character in 'Amazon', which is an 'a'. The encoding process now asks at 306 whether the next 'a' encountered in the search is represented by a code and finds that the next 'a', the 'a' at 210, is represented by the code [=ty] seen at 222. Code [=ty], representing the 'a' at 210, is then added at step 308 to line 404 of FIG. 4 following the code string [Lb:41]. (Note that the 'a' at 230, which precedes the 'a' at 210 in the dictionary is not the 'a' whose code at 232 is used here; this is true because the search process has resumed, as is usual for the search, immediately after the location in the dictionary of the character 'm', rather than returning to the beginning of the dictionary.) After moving the code [=ty] for this letter 'a' at 210 to line 404 of FIG. 4, line 404 now reads Lb:41=ty. The encoding process now asks at 312 whether there is another character in the string of user-selected characters—'Amazon'—and, since there is, resumes its search at 314 through the remaining characters in this same set of 1900 entry characters for the next character in 'Amazon', which is a 'z''. The encoding process now asks at 306 whether the next 'z' encountered in the search is represented by a code and finds that the next 'z', the 'z' at 212, is represented by the code [i] seen at 224. Code [i], representing the 'z' at 212, is then added at step 308 to line 404 of FIG. 4 following the code string [Lb:41=ty]. After moving the code [i] for the character 'z' to line 404 of FIG. 4, line 404 now reads Lb:41=tyi. The encoding process now asks at 312 whether there is another character in the string of user-selected characters and, since there is, resumes its search at 314 through the remaining characters in this same set of 1900 entry characters for the next character in 'Amazon', which is an 'o'. The encoding process now asks at 306 whether this next 'o' encountered in the search is represented by a code and finds that the next 'o', the 'o' at 214, is represented by the code [jpl] seen at 226. Code [jpl], representing the 'o' at 212, is then added at step 308 to line 404 of FIG. 4 following the code string [Lb:41=tyi]. After moving the code [jpl] for the character 'o' to line 404 of FIG. 4, line 404 now reads Lb:41=tyijpl. The encoding process now asks at 312 whether there is another character in the string of user-selected characters and, since there is, resumes its search at 314 through the remaining characters in this same set of 1900 entry characters for the next character in 'Amazon', which is an 'n'. The encoding process now asks at 306 whether the next 'n' encountered in the search is represented by a code and finds that the next 'n', the 'n' at 216, is represented by the code [S#] seen at 228. Code [S#], representing the 'n' at 216, is then added at step 308 to line 404 of FIG. 4 following the code string [Lb:41=tyijpl]. After moving the code [S#] for the character 'n' to line 404 of FIG. 4, line 404 now reads Lb:41=tyijplS#. The encoding process now asks at 312 whether there is another character in the string of user-selected characters—'Amazon'—and, since there is not, the encoding process moves to 316, where it stops, leaving the character string Lb:41=tyijplS# on line 404 as the user's password for the web site, 'Amazon'.

This completes the encoding. In this embodiment, this is the end of the password creation process.

The password created for the Amazon site in this illustrative example is seen on line 404 to be Lb:41s=ty6ijpl$#. Brute force efforts to produce this 16-character sequence of letters, numbers, punctuation marks and symbols are impractical.

Had the search process still needed to proceed and a needed code was unavailable among the remaining characters of the 1900 character set, the search would have returned to the beginning of the set of 1900 entry characters and proceeded as it had at the beginning of the search. The return of the search to the beginning of the set of 1900 entry characters is likely to happen only if there are a relatively large number of characters (in this illustrative example) in the name of the web site, and even then it is unlikely, unless the scrambled set of entry characters has unusually sizable clumps of the identical characters that happen to reduce or eliminate the possibility of finding a particular needed character toward the end of the set of 1900 entry characters.

In other embodiments, character sets other than ASCII are used for codes. One embodiment uses the characters made possible by Unicode, which number about 100,000 printable individual characters and are usable on the internet. The use of so many characters can make for much shorter strong passwords. Even though in UTF-8 which includes ASCII characters as one-byte codes, most of the Unicode characters are two-bytes long and some Unicode characters are represented by three or more bytes—the byte length, and therefore the bit length, of a strong password can be much shorter. One reason for this length advantage is how the difference in the number of characters in ASCII versus the number available in Unicode affects the number of characters needed for a strong password. Using 100,000 characters of a Unicode set, the likelihood that any given two Unicode characters follow each other in an encoded password string is 100,000 times 100,000—or 10 billion to one. But the likelihood that any 2 of the 95 printable ASCII characters follow each other in an encoded password string, $95^2$, or less than 9,000 to 1. If we have as few as 8 Unicode characters from a group of 100,000, the likelihood of occurrence of a given string using characters randomly drawn from these 100,000 characters is one of $100,000^8$, a number that will, today, resist any brute force attack.

But, either ASCII alone and any of the Unicode character sets, including UTF-8, UTF-16 and UTF-32, can make enough codes available to supply different codes to each of the characters used in all written languages, which would allow the use of a single encoding dictionary for all languages. In an embodiment where the codes in the dictionaries of all English language users, for example, are 1900 different single characters chosen from among 100,000, there are many different possible groups of 1900 different single characters and many different possible orderings of those 1900 different single characters. In another embodiment codes vary in length from one character to as many as six characters. It should be understood that in other embodiments the number of characters in a code could be any desired number.

Not only do codes using UTF-8 have the advantage that there are a great many possible single-character codes compared to ASCII, allowing single-character codes that do not easily repeat—which is cryptographically important, but code characters are of so many different languages that few, if any, people anywhere will be familiar with them all—in addition to which some characters from different languages look identical but have different bit patterns. The only way that passwords created using such a great range of characters from many languages can reasonably be expected to be copied is electronically. No 'shoulder surfing' is likely to be successful. And no single keyboard can enter a password encoded with characters from the many different languages represented, even if the user might know the input method for each.

In one embodiment where the dictionaries are the same for each user, the entries include only one set of the characters, punctuation, symbols and numerals used in one language; in English this would mean only one set of 95 ASCII characters for entries and 95 different codes, one representing each dictionary entry.

In an embodiment where the user needs to create a password for use other than for a WWW web site, one where the string of one or more encoded characters that is the password used, for example, to open password-protected files on the user's own computer, the password is expected to be not an alteration of a web address, but an alteration of any other string of characters, including a user-chosen private word or words.

In yet another embodiment, all users have the same encoding dictionaries, including not only the same codes and entries but the same order of the codes and entries. While the encoding step will result in exactly the same string of characters for all users, a following step is performed in which the encoded character string is, in a process known to practitioners of the art, pseudo-randomly scrambled. The seed used for the pseudo-random scrambling is different for each user. As a result of this scrambling of the encoded string, all users will have a different password after the scrambling step. This scrambling step can also be applied in an embodiment where the dictionaries are different for every user.

In one more embodiment, there is no encoding step. Instead, the website address is simply pseudo-randomly scrambled using a seed that is different for each user of the present invention. In one such embodiment where there is no encoding step, the creation of a password for a web site or for password-protecting files or discs by altering a web site address or other string of characters is done at a WWW web site where a different seed is provided for each user.

An Alternative Embodiment that does not Use a Dictionary

Logic flow diagram 500 ((5) summarizes the process of generating a password from a given string. In step 502, encoding logic 110 ((1) receives input data representing a user-selected string of characters. The user generates the user-selected string of characters by physical manipulation of one or more user input devices 102. The user-selected characters may represent a complete URL copied and pasted by the user using conventional user interface techniques. In such a case, the input data represents a primary domain name parsed from the URL in this illustrative embodiment.

In step 504 ((5), encoding logic 110 generates a password from the input data in a deterministic manner. The password generation is deterministic such that the password generated for given input data will always be the same. For example, in the context of the example given above with respect to FIG. 4, the input data "Amazon" will always generate the password "Lb:41+tyijplS#". One example of step 504 is described above in the context of logic flow diagram 300 ((3).

In step 506 ((5), encoding logic 110 presents the generated password to the user.

An alternative embodiment of step 504 is shown as logic flow diagram 504 ((6). In step 602, encoding logic 110 seeds a pseudo-random number generator (PRNG) with a number generated from the input data in a deterministic manner. A pseudo-random number generator generates random numbers but, given a particular seed, will generate a corresponding sequence of pseudo-random numbers. The sequence is repeatable. For example, every time a PRNG is given a seed of "1", the PRNG will generate the same sequence of pseudo-random numbers. Given a different seed, e.g., "2", the PRNG will generate an entirely different sequence of pseudo-random numbers that can be repeated every time the PRNG is seeded with "2". Step 602 is described more completely below.

Loop step 604 and next step 612 define a loop in which encoding logic 110 processes each of a number of character types according to steps 606-610. In this illustrative embodiment, there are four (4) types of characters that can be included in a password generated by encoding logic 110: lower case letters, upper case letters, numerals, and symbols. During each iteration of the loop of steps 604-612, the particular character type processed by encoding logic 110 is referred to as the subject type.

In step 606, encoding logic 110 determines the number of characters of the subject type to include in the password. User interface 800 ((8) represents a user interface of this illustrative embodiment. Text box 810 includes text specifying the number of upper case letters to include in the password and is shown to include the text, "2-4". Thus, the number of upper case letters to include in the password is at least two and no more than four. Encoding logic 110 selects a random number between two and four using the seeded PRNG. In processing the character types of numerals and symbols, encoding logic 110 determines the number of each type to include in the same manner, referencing text entered in text boxes 812 and 814, respectively.

Encoding logic 110 determines the number of lower case letters to include in a different manner in this embodiment. Encoding logic 110 processes lower case letter last and determines an overall length of the generated password according to the text in text box 808. To determine the number of lower case letters to include in the password, encoding logic 110 subtracts the number of upper case letters, numerals, and symbols from the overall length of the password. Care should be taken to ensure that the sum of maximums specified in text boxes 810, 812, and 814 is not greater than the minimum specified in text box 808.

In step 608 and given the number of characters of the subject type to include determined in step 606, encoding logic 110 randomly selects that number of characters and, in step 610, collects them for inclusion in the password.

Processing transfers through next step 612 to loop step 604 and processing according to the loop of steps continues with the next character type. When all character types have been processed according to the loop of steps 604-612, processing by encoding logic 110 transfers to step 614.

In step 614, encoding logic 110 uses the seeded PRNG to shuffle the order of the collected characters to produce the resulting password. After step 614, processing according to logic flow 504 by encoding logic 110 completes.

Given particular input data, e.g., "Amazon", processing according to logic flow diagram 504 produces the same password due to the seeding performed in step 602. Step 602 is shown in greater detail as logic flow diagram 602 ((7).

Peeking ahead at step 712, encoding logic 110 seeds the PRNG with a cryptographic hash of a seed string. Cryptographic hashes are designed, in general, to provide sparsely distributed results. Hashes of nearly identical strings can vary significantly. Nearly identical hashes can be generated from significantly different strings. Accordingly, even minor changes to the seed string can produce a very different hash in step 712 and a very different seed for the PRNG. In addition, even small changes in the seed of a PRNG can generate a very different sequence of pseudo-random numbers.

In step 702, encoding logic 110 retrieves data specific to the computing device of FIG. 1 and stores that data as an initial seed string. The device-specific data can be any combination of device attributes such as serial numbers of device components and device-specific data created by encoding logic 110, such as a time stamp or random data generated in response to the first ever executing of encoding logic 110. Encoding logic 110 can also store different device-specific data for each distinct input data entered by the user.

In step 704, encoding logic 110 combines the input data into the seed string, e.g., by concatenation.

Loop step 706 and next step 710 define a loop in which encoding logic 110 processes each of a number of reset events for the input data according to step 708. There may be no reset events for the input data, in which case encoding logic 110 skips the loop of steps 706-710.

User interface 800 ((8) includes a check box 818 in which the user can request that the password for the input data of text box 802 is reset, i.e., is new and not any previously generated password for the input data. Suppose the user believes that the password generated by the input data "Amazon" is compromised and would like to generate a different password for "Amazon". By selecting check box 818 and pressing button 806 with "Amazon" stored in text box 802, the user causes encoding logic 110 to record a reset event for "Amazon" that includes a reset salt in encoding data 112 ((1). The reset salt is text to be included in the seed string to cause a different hash and therefore a different seed to be generated in step 712 ((7). In this illustrative embodiment, the reset salt is a time stamp of the reset event.

After step 708, processing by encoding logic 110 transfers through next step 710 to loop step 706 in which encoding logic 110 processes the next reset event of the input data according to the loop of steps 706-710. When all reset events of the input data have been processed according to the loop of steps 706-710, processing transfers to step 712.

As discussed above, encoding logic 110 seeds the PRNG with a cryptographic hash of the seed string. At this point, the seed string includes (i) textual device-specific data such that the device of FIG. 1 produces different passwords than a different device, (ii) the input data such that the password generated for the input data (e.g., "Amazon") is different than passwords generated for different input data, and (iii) textual reset salts for each reset event to produce different passwords for the input data after each reset event than a previously generated password for the input data.

Returning to user interface 800 ((8), the encoding logic 110 displays the password generated in step 504 ((5) in text box 804 ((8). The user can specify in text box 816 which symbol characters, i.e., any characters other than letters and numerals, are valid password characters, since various sites and services disagree as to which symbol characters are valid password characters.

It should be noted that any change in any of text boxes 808-816 can change the password generated by encoding logic 110 for given input data. Accordingly, when a user changes any of those fields, encoding logic 110 records the modified settings of text boxes 808-816 for the input data in encoding data 112. For security, it is preferred that encoding logic 110 associates the modified settings as associated within encoding data 112 with a hash of the input data rather than the input data itself.

The above description is illustrative only and not limiting. The present invention is defined only by the claims which follow and their full range of equivalents. It is intended that the following appended claims be interpreted as including all such alterations, modifications, permutations and substitute equivalents as fall within the true scope and spirit of the present invention.

What is claimed is:

1. A computer-implemented method implemented by a user's hardware processor device, wherein the user creates in a repeatable manner from user-selected data including a web site name identical to data input by users of other devices with hardware processors employing the same method passwords that differ from those of the users of other devices, the method comprising:
   receiving in the user's hardware processor device user-selected data including a web site name generated by a user by physical manipulation of one or more user input devices;
   deriving, by the hardware processor, password data from the user-selected data including the web site name, wherein the password data is randomized in a deterministic manner;
   deriving the password data comprises:
   searching a device-unique predetermined electronic encoding dictionary wherein:
   each entry in the predetermined dictionary associates at least one character of a character of the user-selected data with a corresponding code;
   each code in the predetermined dictionary comprises at least one character;
   each entry appears at least twice in the predetermined dictionary; each entry has a different code each time it appears in the predetermined dictionary;
   the order of codes in the predetermined dictionary is unique for each user;
   beginning the search of the user-selected data wherein the data is a string of at least two characters for the code of the first character of the user-selected data at the first entry in the dictionary;
   resuming the search for each subsequent character in the user-selected data with the character immediately following the location in the dictionary where the previous character of the user-selected data was found;
   replacing each of the one or more characters of the user-selected data by a code representing each character of the string in the predetermined encoding dictionary;
   returning to the first entry of the dictionary to resume the search only if no entry for a character of the user-selected data is found in the remaining entries of the dictionary;
   beginning the search for the code for the next character in the user-selected data if no entry is found in the predetermined dictionary for the present character in the data;
   stopping the encoding process after a search of the predetermined dictionary has been completed for each and every character of the user-selected data and a code representing each character in the user-selected data has replaced each character of the string, thereby creating the password; and
   pseudo-randomly scrambling the created password using a seed unique to the user.

2. The method of claim 1 wherein the user-selected string of characters is other than a name for a World Wide Web web site.

3. The method of claim 1 wherein one or more of the codes in the predetermined dictionary include characters not present among the entries in the same predetermined dictionary.

4. The method of claim 1 wherein the number of times an entry appears among the entries in the predetermined dictionary reflects the entry's frequency of use in the language in which it is used.

5. The method of claim 1 wherein the order in which codes appear in the predetermined dictionary is the result of pseudo-random scrambling of the codes.

6. The method of claim 1 wherein the order in which entries appear in the predetermined dictionary is the result of pseudo-random scrambling of the entries.

7. The method of claim 1 wherein the codes include codes of more than one character.

8. The method of claim 1 wherein at least one character appears more than once as an entry in the dictionary causing such entries to have a different code in each appearance in the dictionary and thereby making possible different encodings of the same character.

9. The method of claim 1 wherein the codes are comprised of characters seen in Unicode.

10. The method of claim 1 wherein every character appearing in the user-selected data but not in the entries of the predetermined dictionary is replaced by the same predetermined unassigned code during encoding.

* * * * *